(12) United States Patent
Levi et al.

(10) Patent No.: US 12,294,450 B2
(45) Date of Patent: May 6, 2025

(54) TIME-DIVISION MULTIPLEXING (TDM) SCHEDULING IN A NETWORK ADAPTER

(71) Applicant: MELLANOX TECHNOLOGIES, LTD., Yokneam (IL)

(72) Inventors: Dotan David Levi, Kiryat Motzkin (IL); Ioannis (Giannis) Patronas, Athens (GR); Wojciech Wasko, Młynek (PL); Paraskevas Bakopoulos, Ilion (GR); Dimitrios Syrivelis, Volos (GR); Elad Mentovich, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 472 days.

(21) Appl. No.: 17/665,600

(22) Filed: Feb. 7, 2022

(65) Prior Publication Data
US 2023/0239068 A1     Jul. 27, 2023

(30) Foreign Application Priority Data
Jan. 24, 2022  (GR) .............................. 20220100062

(51) Int. Cl.
*H04J 14/08*     (2006.01)
*H04J 3/06*      (2006.01)
*H04J 14/02*     (2006.01)

(52) U.S. Cl.
CPC ................ *H04J 14/08* (2013.01); *H04J 3/06* (2013.01); *H04J 14/0267* (2013.01)

(58) Field of Classification Search
CPC ..... H04W 74/08; H04W 74/00; H04W 72/04; H04W 16/02; H04W 16/10; H04W 72/0446; H04L 27/26; H04J 14/08; H04J 14/02
See application file for complete search history.

(56) References Cited

U.S. PATENT DOCUMENTS

| | | |
|---|---|---|
| 7,426,206 B1 | 9/2008 | Ofek et al. |
| 9,584,885 B2 | 2/2017 | Mehrvar |
| 9,883,262 B2 | 1/2018 | Hattori et al. |
| 2006/0115267 A1 | 6/2006 | Kesselman et al. |
| 2006/0120371 A1 | 6/2006 | Huang et al. |
| 2006/0120379 A1 | 6/2006 | Beshai |

(Continued)

OTHER PUBLICATIONS

Klyne et al., "Date and Time on the Internet: Timestamps," Request for Comments: 3339, Network Working Group, The Internet Society, pp. 1-18, Jul. 2002.

(Continued)

*Primary Examiner* — Iqbal Zaidi
(74) *Attorney, Agent, or Firm* — Meitar Patents Ltd.; Daniel Kligler (57) ABSTRACT

A network adapter includes a host interface and a scheduler. The host interface is configured to receive, from one or more hosts, packets for transmission to respective destinations over a network. The scheduler is configured to synchronize to a time-division schedule that is employed in the network, the time-division schedule specifying (i) multiple time-slots and (ii) multiple respective groups of the destinations that are reachable during the time-slots, and, based on the time-division schedule, to schedule transmission times of the packets to the network on time-slots during which the respective destinations of the packets are reachable.

28 Claims, 6 Drawing Sheets

(56) References Cited

U.S. PATENT DOCUMENTS

| | | | |
|---|---|---|---|
| 2015/0104171 A1 | 4/2015 | Hu et al. | |
| 2016/0021688 A1* | 1/2016 | Panah | H04W 8/005 370/338 |
| 2016/0337442 A1* | 11/2016 | Idicula | H04L 47/828 |
| 2018/0006681 A1* | 1/2018 | Bi | H04B 1/715 |
| 2020/0045519 A1 | 2/2020 | Raleigh et al. | |
| 2020/0092950 A1* | 3/2020 | Schnaare | H04J 3/0655 |
| 2021/0297151 A1 | 9/2021 | Levi et al. | |
| 2021/0384998 A1 | 12/2021 | Mula et al. | |

OTHER PUBLICATIONS

Forencich et al., "Corundum: An Open-Source 100-Gbps NIC," Proceedings of the 2020 IEEE 28th Annual International Symposium on Field-Programmable Custom Computing Machines (FCCM), pp. 38-46, year 2020.

IEEE Standard 802.1Qbv, "IEEE Standard for Local and Metropolitan Area Networks—Bridges and Bridged Networks—Amendment 25: Enhancements for Scheduled Traffic," IEEE Computer Society, pp. 1-57, Mar. 18, 2016.

IEEE Standard 802.1Qat, "IEEE Standard for Local and Metropolitan Area Networks—Virtual Bridged Local Area Networks—Amendment 14: Stream Reservation Protocol (SRP)," IEEE Computer Society, pp. 1-119, Sep. 30, 2010.

IEEE Standard 1588-2008, "IEEE Standard for a Precision Clock Synchronization Protocol for Networked Measurement and Control Systems", IEEE Instrumentation and Measurement Society, pp. 1-289, Jul. 24, 2008.

U.S. Appl. No. 17/413,555 Office Action dated Jan. 5, 2024.

* cited by examiner

TIME-DIVISION MULTIPLEXING (TDM) SCHEDULING IN A NETWORK ADAPTER

CROSS-REFERENCE TO RELATED APPLICATIONS

This application claims priority from Greek Patent Application 20220100062, filed Jan. 24, 2022, whose disclosure is incorporated herein by reference.

FIELD OF THE INVENTION

The present invention relates generally to network communication, and particularly to methods and systems for time-division multiplexing (TDM) scheduling in communication networks.

BACKGROUND OF THE INVENTION

In various scenarios, communication of packets over a network is governed by a Time-Division Multiplexing (TDM) regime. One example is a network that uses optical switches. Another example is a fronthaul network in a Fifth-Generation (5G) cellular network.

In "Corundum: An Open-Source 100-Gbps NIC," 2020 IEEE 28th Annual International Symposium on Field-Programmable Custom Computing Machines (FCCM), Fayetteville, Ark., USA, 2020, pages 38-46, Forencich et al., describe an open-source, FPGA-based prototyping platform for network interface development. One demonstrated use-case is an implementation of a microsecond-precision time-division multiple access (TDMA) hardware scheduler.

SUMMARY OF THE INVENTION

An embodiment of the present invention that is described herein provides a network adapter including a host interface and a scheduler. The host interface is configured to receive, from one or more hosts, packets for transmission to respective destinations over a network. The scheduler is configured to synchronize to a time-division schedule that is employed in the network, the time-division schedule specifying (i) multiple time-slots and (ii) multiple respective groups of the destinations that are reachable during the time-slots, and, based on the time-division schedule, to schedule transmission times of the packets to the network on time-slots during which the respective destinations of the packets are reachable.

In some embodiments, the one or more hosts are unaware of the time-division schedule. In some embodiments, the received packets originate from one or more applications running on the one or more hosts, and the one or more applications are unaware of the time-division schedule. In some embodiments, the scheduler is configured to schedule the transmission times regardless of whether the packets are received from the one or more hosts in accordance with the time-division schedule.

In some embodiments, the scheduler is configured to queue work-requests of the packets in one or more queues, and to serve the work-requests of the packets in accordance with the time-division schedule. In an example embodiment, the scheduler is configured to cause a packet to be transmitted during a given time-slot, by queuing a wait-work-request, which is indicative of a timing of the given time-slot, ahead of a work-request of the packet. In another embodiment, the scheduler is configured to queue all the work-requests in a single queue. In yet another embodiment, the time-division schedule specifies multiple interleaved repetitions of each time-slot, and the scheduler is configured to queue the work-requests in multiple queues, each queue associated with the repetitions of a respective time-slot. In a disclosed embodiment, the scheduler is configured to queue the work-requests in a plurality of virtual output queues (VOQs) associated respectively with the time-slots, and to transfer the work-requests from the VOQs to the one or more queues.

In some embodiments, the scheduler is configured to send completion notifications to the one or more hosts. In an example embodiment, the scheduler is configured to send the completion notifications responsively to scheduling of the packets. In another embodiment, the scheduler is configured to send the completion notifications responsively to actual transmission of the packets to the network. In some embodiments, the scheduler is configured to send the completion notifications to a specified packet source in a same order in which the packets were received from the given specified packet source, irrespective of an order in which the packets are transmitted to the network.

In some embodiments, the time-division schedule is employed in a trusted software entity external to the network adapter. In other embodiments, the time-division schedule is employed in a trusted software entity in the network adapter.

There is additionally provided, in accordance with an embodiment of the present invention, a method including receiving, from one or more hosts, packets for transmission to respective destinations over a network. Synchronization is made to a time-division schedule that is employed in the network, the time-division schedule specifying (i) multiple time-slots and (ii) multiple respective groups of the destinations that are reachable during the time-slots. Based on the time-division schedule, transmission times of the packets to the network are scheduled on time-slots during which the respective destinations of the packets are reachable.

The present invention will be more fully understood from the following detailed description of the embodiments thereof, taken together with the drawings in which:

DETAILED DESCRIPTION OF EMBODIMENTS

Overview

In a packet network that is governed by a TDM schedule, such as an optical switching network, the network topology alternates among multiple different topologies in accordance with a defined TDM schedule. The TDM schedule typically follows a periodic pattern of time-slots. From the perspective of a given network endpoint (also referred to as "host"), the implication is that a given destination is reachable only during some of the time-slots. As such, packets addressed to a given destination should be transmitted only during certain time-slots and not during others, according to the TDM schedule.

One hypothetical solution is to make all the network endpoints (hosts, i.e., all user devices served by the network, e.g., servers or other computing devices) aware of the TDM schedule. Awareness to the TDM schedule would enable an endpoint to transmit packets to a destination only during time-slots in which that destination is reachable. In practice, however, network endpoints are usually not under the network operator's control, and even if they were, it is practically impossible to control the vast number of different endpoint configurations.

Embodiments of the present invention that are described herein provide methods and systems, which enable network endpoints to communicate over TDM-governed networks without being aware of the TDM schedule. In the disclosed techniques, awareness to the TDM schedule, and suitable scheduling of packets according to the TDM schedule, are carried out in the network adapters that connect the endpoints to the network.

In some embodiments, a network adapter is configured to connect one or more hosts to a network that employs a TDM schedule. The TDM schedule specifies multiple time-slots, typically a periodic pattern of interleaved time-slots. For each time-slot, the TDM schedule specifies a respective group of destinations that are reachable during that time-slot.

The network adapter receives packets from the hosts, each packet being addressed to a certain destination. The network adapter comprises a scheduler that schedules the transmission times of the packets to the network according to the TDM schedule. The scheduling operation ensures that each packet is transmitted to the network during a time-slot in which the destination of the packet is reachable.

The disclosed network adapters enable any host to communicate successfully over a TDM-governed network, without the host having to be aware of the TDM schedule being used. In some embodiments, the packets originate from one or more applications ("apps") running on the host. Even if certain elements of the disclosed solution (e.g., certain queues or buffers, or even certain scheduling functionality) are implemented in the host, the apps remain unaware of the TDM schedule being used. As such, the disclosed techniques simplify large-scale adoption of TDM-governed networks.

Several non-limiting examples of scheduler configurations are described herein. In particular, various queueing mechanisms that can be used by the scheduler are described. Aspects of generating completion notifications to the hosts are also addressed.

System Description

Figure 1:
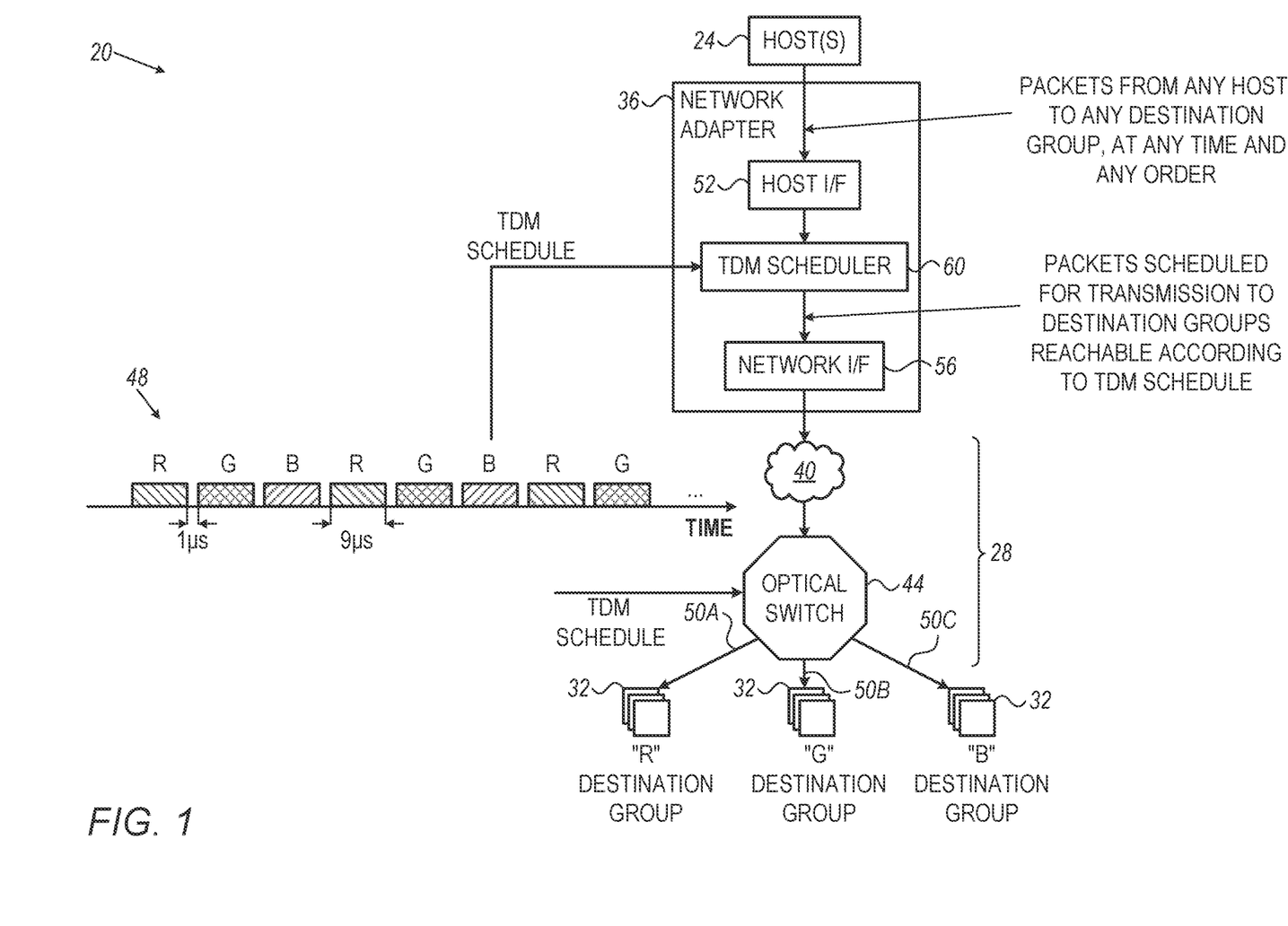
FIG. 1 is a block diagram that schematically illustrates a packet communication system that is governed by a Time-Division Multiplexing (TDM) schedule, in accordance with an embodiment of the present invention.

FIG. 1 is a block diagram that schematically illustrates a packet communication system 20 that is governed by a Time-Division Multiplexing (TDM) schedule, in accordance with an embodiment of the present invention. System 20 may comprise, for example, a data center, a fronthaul network in a 5G cellular network, or any other suitable type of packet communication system.

In the example of FIG. 1, system 20 is governed by a TDM schedule because it comprises one or more optical switches. Generally, however, the disclosed techniques are applicable in any other suitable system or network, which is governed by a TDM schedule for any reason.

System 20 comprises one or more hosts 24 that send packets over a packet network 28 to multiple destinations 32. A network adapter 36 is used for connecting hosts 24 to network 28. System 20, including network 28 and network adapter 36, may operate in accordance with any suitable network protocol, e.g., Ethernet or Infiniband-.

Network adapter 36 may comprise, for example, a Network Interface Controller (NIC), a Host Channel Adapter (HCA), a Data Processing Unit (DPU—also sometimes referred to as "SmartNic"), a network enabled Graphics Processing unit (GPU), or any other suitable type of network adapter.

Hosts 24 and destinations 32 may comprise any suitable type of computing devices, e.g., servers or other computers. In practice, the communication between hosts 24 and destinations 32 is typically bidirectional; the figure and description focus on transmission from hosts 24 to destinations 32, for the sake of clarity.

In the example of FIG. 1, network 28 comprises one or more network elements 40, e.g., electronic network switches, and an optical switch 44 that is governed by a TDM schedule 48. This highly-simplified network configuration is meant to demonstrate a network that employs a TDM schedule. Real-life networks typically comprise a large number of elements of various kinds. The disclosed techniques are applicable to any such network.

TDM schedule 48, which governs the operation of optical switch 44, is depicted on the left-hand side of the figure. As seen, schedule 48 specifies three types of time-slots denoted Red (R), Green (G) and Blue (B), which are interleaved with one another and repeated cyclically in alternation. The R/G/B notation is chosen merely for convenience and does not connote any wavelength or other optical properties of switch 44 or of the optical signals it processes. Each time-slot has a duration of 9 μs. A guard-band of 1 μs is inserted between adjacent time-slots. Alternatively, any other suitable TDM schedule can be used.

In the present example, optical switch 44 operates as follows in accordance with TDM schedule 48:

During the "R" time-slots, all incoming packets are forwarded to a network link 50A, leading to a group of destination nodes 32 denoted "R".

During the "G" time-slots, all incoming packets are forwarded to a network link 50B, leading to a group of destination nodes 32 denoted "G".

During the "B" time-slots, all incoming packets are forwarded to a network link 50C, leading to a group of destination nodes 32 denoted "B".

When switch 44 operates in this manner, destinations 32 belonging to the "R" group are reachable only during the "R" time-slots; destinations 32 belonging to the "G" group are reachable only during the "G" time-slots; and destinations 32 belonging to the "B" group are reachable only during the "B" time-slots. Hosts 24, however, are typically unaware of TDM schedule 48, and may send packets to any destination 32 at any time.

In some embodiments, network adapter 36 schedules the packets arriving from hosts 24 to comply with TDM schedule 48. This solution ensures successful delivery of packets from hosts 24 to destinations 32, notwithstanding the fact that hosts 24 are unaware of the TDM schedule.

In the example of FIG. 1, network adapter 36 comprises a host interface 52 for receiving packets from hosts 24, a network interface 56 for sending the packets to network 28, and a TDM scheduler 60 for scheduling the packets in accordance with TDM schedule 48.

In various embodiments, scheduler 60 may synchronize to TDM schedule 48 in various ways. For example, TDM schedule 48 may be synchronized to a common time-base of network 28, e.g., using the IEEE 1558 Precision Time Protocol (PTP). In such an embodiment, both optical switch 44 and network adapter 36 may comprise PTP Hardware Clocks (PHCs—not shown in the figure) that synchronize to the PTP timing. Scheduler 60 may use the PTP timing to synchronize to TDM schedule 48. Alternatively, any other suitable synchronization method can be used.

The scheduling operation performed by scheduler 60 ensures that the packets sent to network 28 comply with TDM schedule 48. In the present example, scheduler 60 transmits packets addressed to destinations 32 belonging to the "R" group only during the "R" time-slots of TDM schedule 48; transmits packets addressed to destinations 32 belonging to the "G" group only during the "G" time-slots; and transmits packets addressed to destinations 32 belonging to the "B" group only during the "B" time-slots. Examples of queuing and scheduling schemes that achieve this goal are described further below with reference to FIGS. 3-5.

The queueing and scheduling configurations described herein can be implemented within network adapter 36, or they can be embodied in a firmware or software suite that runs on host 24. In some embodiments, TDM schedule 48 is employed in a trusted software entity within network adapter 36. In alternative embodiments, the TDM schedule is employed in a trusted software entity external to the network adapter.

Figure 2:
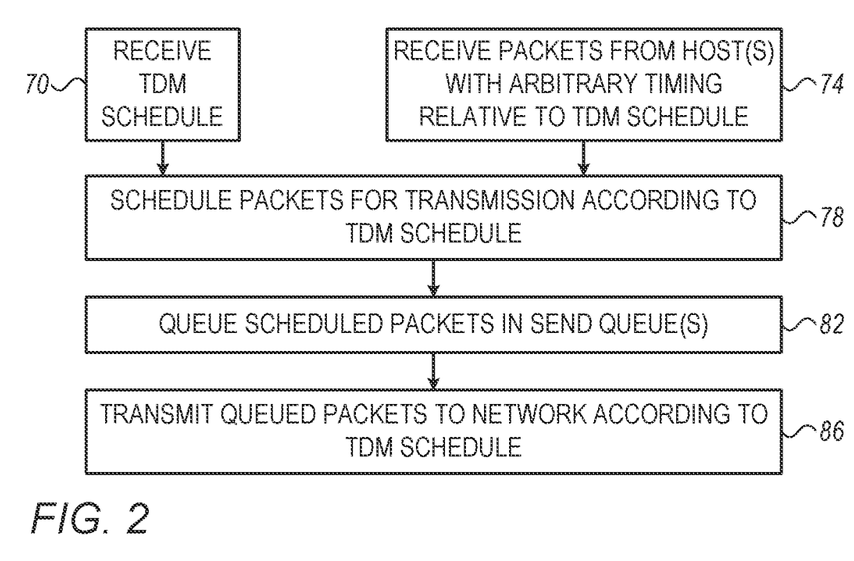
FIG. 2 is a flow chart that schematically illustrates a method for TDM scheduling in a network adapter, in accordance with an embodiment of the present invention.

FIG. 2 is a flow chart that schematically illustrates a method for TDM scheduling in network adapter 36, in accordance with an embodiment of the present invention. The method begins with TDM scheduler 60 of network adapter 36 synchronizing to TDM schedule 48, at a TDM schedule reception stage 70. At a packet reception stage 74, network adapter 36 receives packets from (one or more) hosts 24 via host interface 52.

At a scheduling stage 78, TDM scheduler 60 schedules the packets in accordance with TDM schedule 48. At a queuing stage 82, scheduler 60 queues the scheduled packets for transmission in one or more queues. At a transmission stage 86, network adapter 36 transmits the queued packets via network interface 86 to network 28, in accordance with TDM schedule 48.

Example Queuing and Scheduling Configurations

Figure 3:
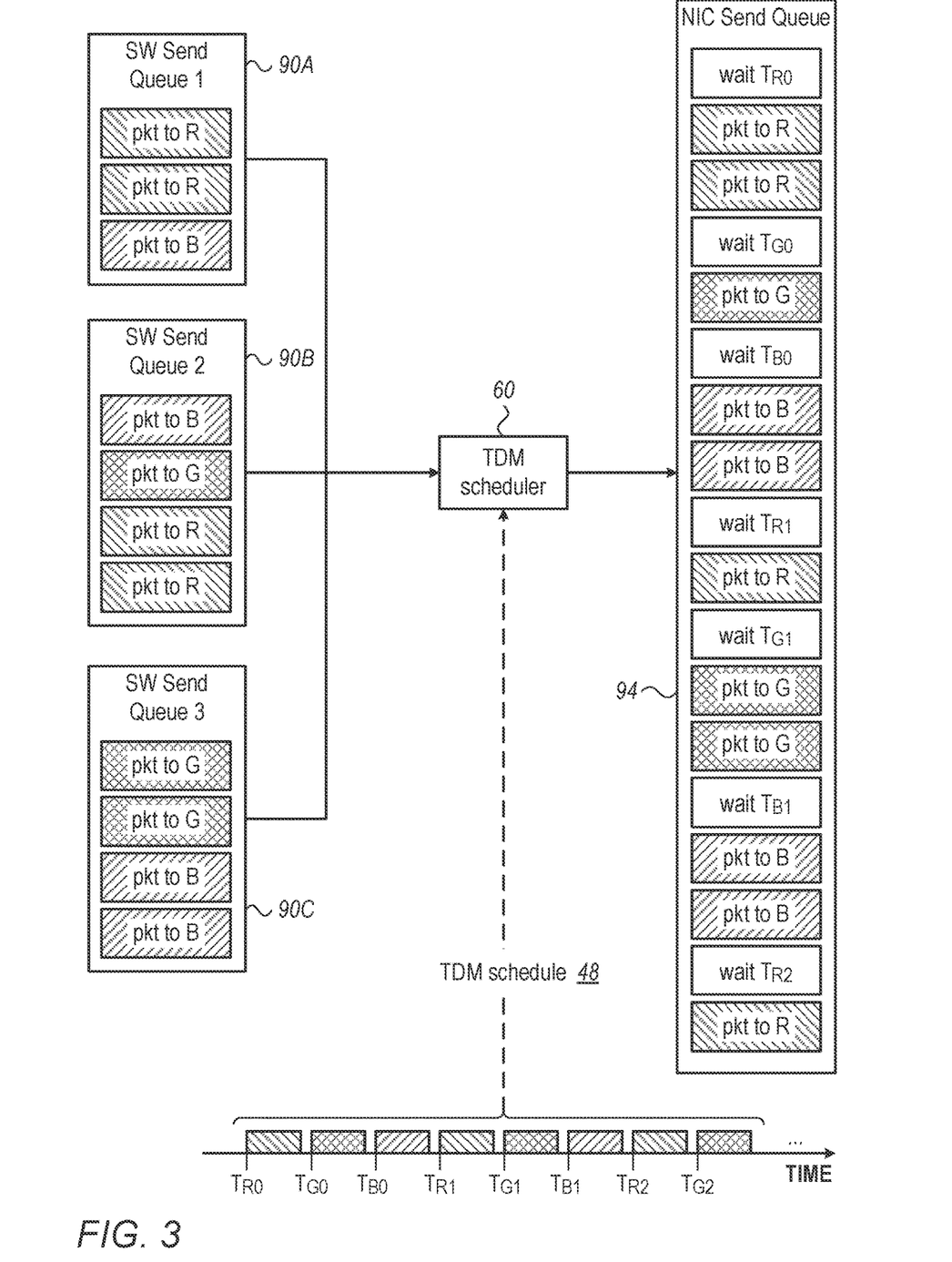
FIGS. 3-5 are block diagrams that schematically illustrate queuing and scheduling configurations for TDM scheduling in a network adapter, in accordance with embodiments of the present invention.

FIG. 3 is a block diagram that schematically illustrates a queuing and scheduling configuration for TDM scheduling in network adapter 36, in accordance with an embodiment of the present invention. In the present example, the software of hosts 24 ("host SW") maintains one or more SW send queues 90 that are accessible to scheduler 60. In the present example the host SW maintains three SW send queues denoted 90A, 90B and 90C. The host SW posts work requests on queues 90A-90C, each work request pointing to a respective packet that is to be transmitted. Work requests are also referred to as Work Queue Elements (WQEs), and the two terms are used interchangeably herein.

The requests posted on SW send queues 90A-90C may specify packets in any order and to any destination 32, irrespective of TDM schedule 48. As seen in the figure, a given SW send queue 90 may store intermixed work requests for packets addressed to any of the "R", "G" or "B" destination groups.

TDM scheduler schedules the packets by reading the work requests from SW send queues 90A-90C, and posting corresponding requests on a NIC send queue 94. Unlike queues 90A-90C, the work requests on queue 94 are ordered according to the order of the time-slots of TDM schedule 48, and specify the timing of the time-slots.

In the present example, the start times of the time-slots of TDM schedule 48 are denoted $T_{R0}, T_{G0}, T_{B0}, T_{R1}, T_{G1}, T_{B1}, T_{R2}, T_{G2}, T_{B2}, \ldots$ wherein the (R, G, B) index specifies the destination group, and the $\{0, 1, 2, \ldots\}$ numerical index is a running index that increments over the time-slots of a given destination group. Scheduler 60 posts the work requests that specify the packets on NIC send queue 94. In addition to the work requests that specify the packets, scheduler 60 posts on queue 94 "wait requests" that specify waiting until the time specified therein.

Network adapter 36 transmits the packets to network 28 by reading the work requests from the head (top) of NIC send queue 94 and serving them. Thus, in the example of FIG. 3, adapter 36 will perform the following:

- Wait until $T_{R0}$ (the start time of time-slot R0), then transmit two pending packets addressed to destinations in the "R" group.
- Wait until $T_{G0}$ (the start time of time-slot G0), then transmit a single pending packet addressed to a destination in the "G" group.
- Wait until $T_{B0}$ (the start time of time-slot B0), then transmit two pending packets addressed to destinations in the "B" group.
- Wait until $T_{R1}$ (the start time of time-slot R1), then transmit a pending packet addressed to a destination in the "R" group.
- Wait until $T_{G1}$ (the start time of time-slot G1), then transmit two pending packets addressed to destinations in the "G" group.
- Wait until $T_{B1}$ (the start time of time-slot B1), then transmit two pending packets addressed to destinations in the "B" group.
- Wait until $T_{R2}$ (the start time of time-slot R2), then transmit a pending packet addressed to a destination in the "R" group.

. . .

In the example above, the times specified in the "wait requests" are the start times of the time-slots. Alternatively, any other suitable convention can be used. In other words, the wait requests may specify any times that are indicative of the start times of the time-slots.

In the present example scheduler 60 maintains a single NIC send queue 94. In an alternative embodiment, scheduler 60 may maintain multiple NIC send queues 94, as, for example, in FIG. 4 below.

In an example embodiment, scheduler 60 may schedule the packets by executing the following pseudo-code:

```
schedule = build_TDM_network_schedule( )
nic_sq = open_NIC_SQ( )
forever:
    [tstart, duration, recipient] = get_next_timeslot(schedule)
    # do not schedule too far in advance
    sleep_until(start − max_schedule_advance)
    # add a wait instruction in the NIC SQ
    fence(nic_sq, tstart)
    time_left = duration
    foreach sw_sq:
        pkt = fetch_next_pkt(sw_sq)
        target = identify_recipient(pkt)
```

```
        # go to next sw_sq if this packet is not
        # destined to the recipient we're trying to
        # schedule
        if target != recipient:
            continue
        time_needed=calculate_pkt_duration_on_link(pkt)
        if time_needed <= time_left:
            # move pkt from SW SQ to NIC SQ
            move_next_pkt(sw_sq, nic_sq)
            time_left = time_left – time_needed
```

Figure 4:
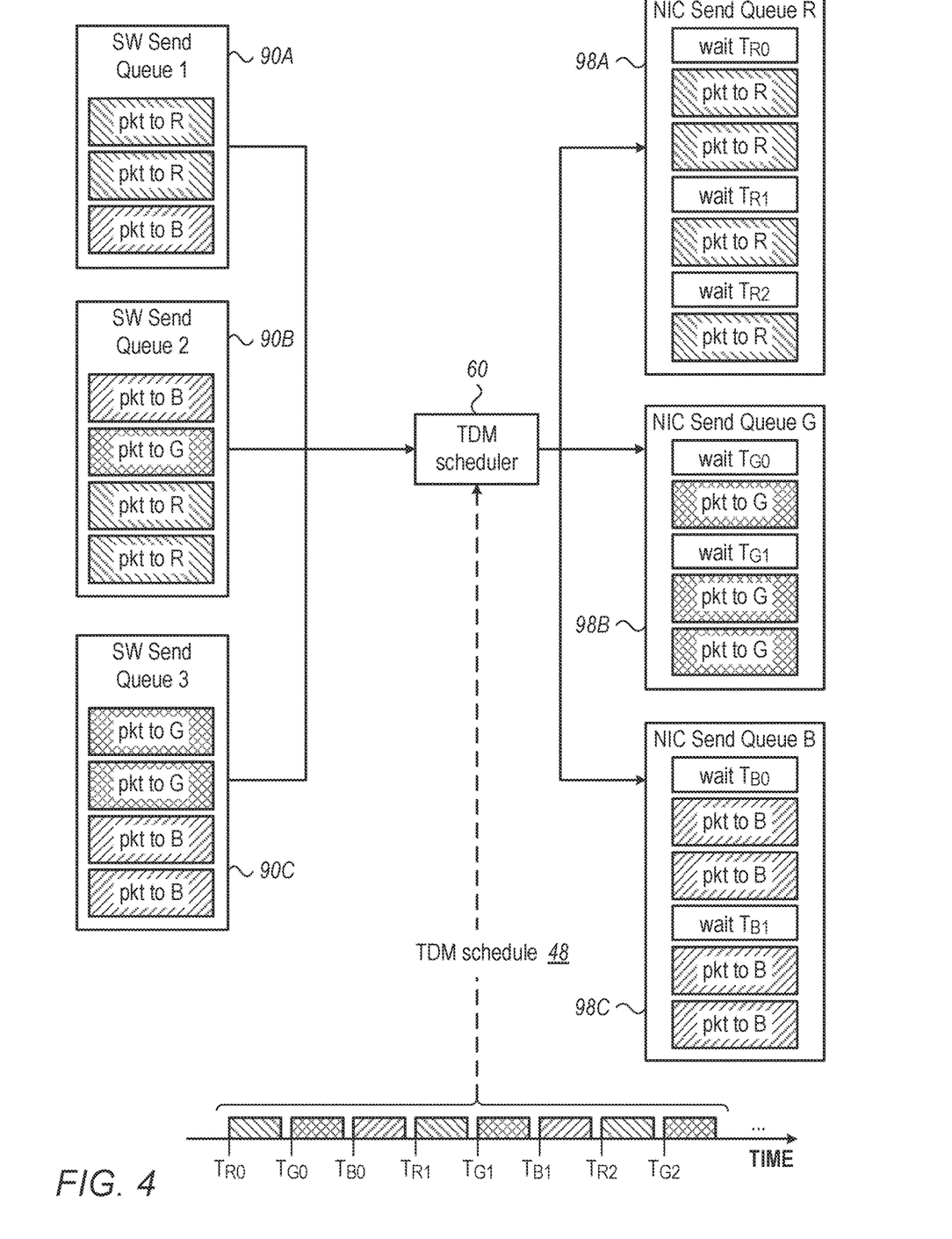

FIG. 4 is a block diagram that schematically illustrates a queuing and scheduling configuration for TDM scheduling in network adapter 36, in accordance with another embodiment of the present invention. Unlike the example of FIG. 3 above, in the present example scheduler 60 maintains three separate NIC send queues 98A-98C, for the three time-slot types "R", "G" and "B", respectively (i.e., a separate NIC send queue per destination group).

In a typical scheduling process, scheduler 60 reads work requests from the heads of SW send queues 90A-90C (e.g., serves the SW send queues in a Round-Robin manner). For work request, the scheduler identifies the destination of the packet, e.g., by parsing and examining the destination MAC address or destination IP address included in the packet header. From the packet destination address, the scheduler derives the destination group (e.g., "R", "G" or "B") of the packet, and thus the possible time-slots during which the packet can be transmitted to the network. The scheduler then moves the work request to the NIC send queue (e.g., 98A, 98B or 98C) that is assigned to the destination group of the packet. The scheduler also adds "wait requests" as appropriate.

The network adapter then transmits the packets to network 28 in accordance with the NIC send queues. Example techniques for packet transmission using "wait requests" (also referred to as "wait commands"), which can be used by scheduler 60, are described in U.S. Patent Application Publication 2021/0297151, entitled "TDMA Networking Using Commodity NIC/Switch," whose disclosure is incorporated herein by reference.

The above scheme can be expressed using the following pseudo-code:

```
    for each sw_sq:
        pkt = fetch_next_pkt(sw_sq)
        time_needed = calculate_pkt_duration_on_link(pkt)
        target = identify_recipient(pkt)
        if time_needed<=time_left_in_current_window(target):
        ...
```

Avoiding Head-of-Line Blocking Using Intermediate Virtual Output Queues

The queuing and scheduling schemes of FIGS. 3 and 4 above are prone to Head-of-Line (HoL) blocking in SW send queues 90A-90C. For example, during a "R" slot, a "G" or "B" work request located at the head of the queue will block "R" work requests located further down in the queue. In some embodiments, such blocking is avoided by using an intermediate structure of Virtual Output Queues (VOQs).

Figure 5:
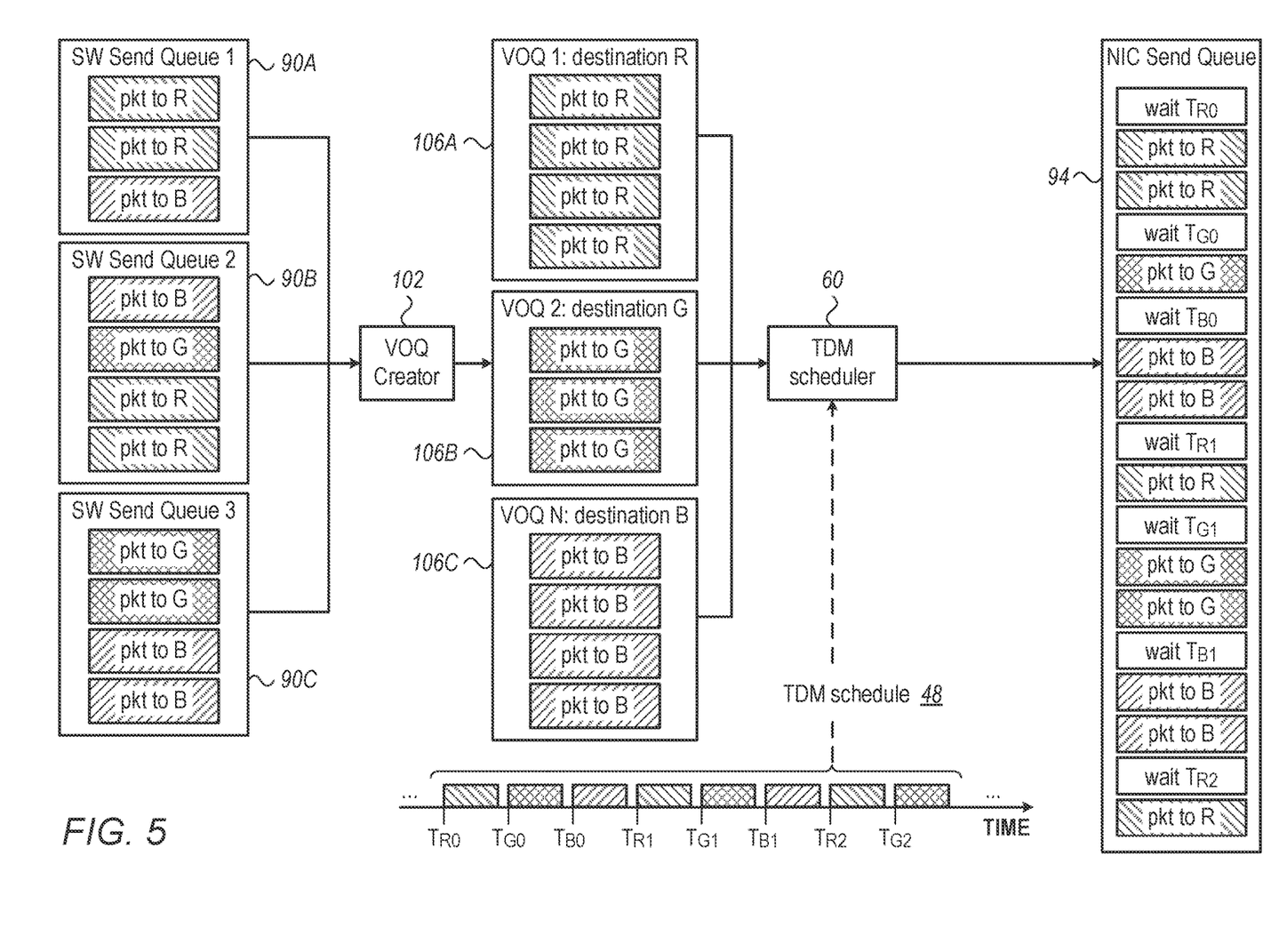

FIG. 5 is a block diagram that schematically illustrates a queuing and scheduling configuration that uses VOQs, in accordance with an alternative embodiment of the present invention. In this embodiment, a VOQ creator circuit 102 and multiple VOQs 106A-106C are inserted between SW send queues 90A-90C and scheduler 60.

Each VOQ is assigned to queue the work requests for a respective destination group. In the present example, three VOQs denoted 106A-106C are assigned to queue the "R", "G", and "B" requests, respectively. VOQ creator 102 continuously scans SW send queues 90A-90C and moves work requests from the heads of the SW send queues to VOQs 106A-106C. This operation is performed irrespective of the TDM schedule. Scheduler 60 schedules the packets by serving VOQs 106A-106C (instead of SW send queues 90A-90C). Since each VOQ stores requests of a single respective destination group, HoL blocking is avoided.

The queuing and scheduling schemes described above and shown in FIGS. 3-5 are example schemes, which have been chosen purely for the sake of conceptual clarity. In alternative embodiments, any other suitable scheme can be used.

Generation of Completion Notifications

A host 24 that posts a work request on one of SW send queues 90 typically expects to receive a completion notification, which indicates that the respective packet was indeed sent. Network adapter 36 and hosts 24 may use suitable completion queues (not shown in the figures) for posting completion notifications. In various embodiments, scheduler 60 may use various techniques and criteria for returning completion notifications to hosts 24.

In some embodiments, scheduler 60 issues a completion notification for a packet as soon as the packet has been scheduled for transmission (e.g., as soon as a work request has been posted on a NIC send queue). At this stage transmission of the packet to network 28 has not begun yet, and may take some time to begin depending on the TDM schedule. In other embodiments, scheduler 60 issues a completion notification for a packet in response to actual transmission of the packet to the network.

In some embodiments, when scheduler 60 issues a completion notification in response to scheduling (but not transmission) of a packet, the scheduler also (i) copies the packet to some intermediate memory and (ii) configured the corresponding work request to point to the copy of the packet in the intermediate memory. These additional steps are needed because the completion notification indicates to the host that it is permitted to re-use the buffer space used for the packet in question.

Figure 6:
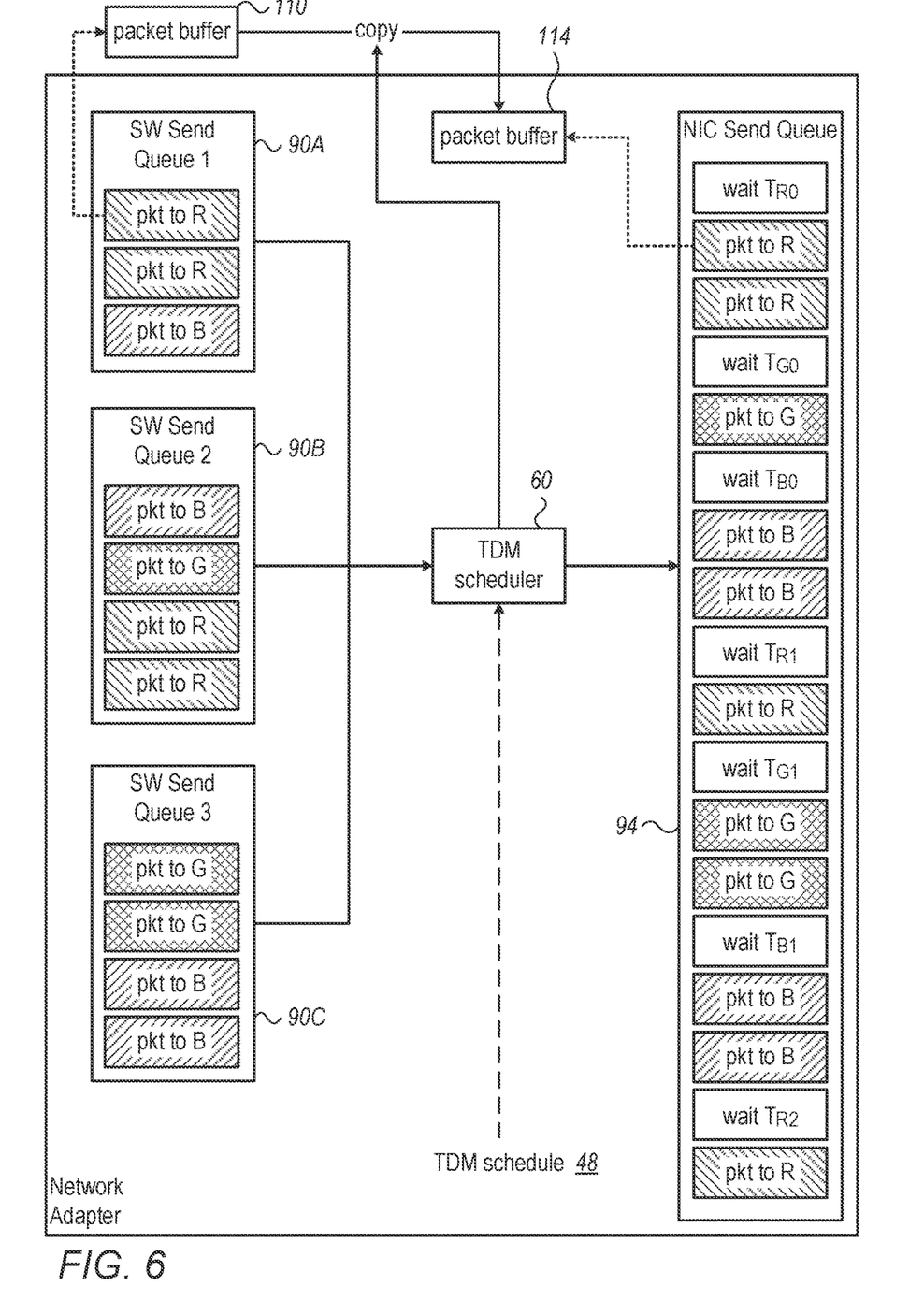
FIG. 6 is a block diagram that schematically illustrates a mechanism for providing completion notifications from a network adapter to a host, in accordance with an embodiment of the present invention.

FIG. 6 is a block diagram that schematically illustrates the above-described copy mechanism, in accordance with an embodiment of the present invention. The figure shows a packet buffer 110, which typically resides in the host memory and is used for storing the packets sent from the host to the network adapter. The work requests posted by the host on the SW send queues point to the packets stored in buffer 110. This is demonstrated in the figure by a work request of a packet that is posted on SW send queue 90A.

In addition, scheduler 60 maintains an additional packet buffer 114, e.g., in the network adapter memory. Packet buffer 114 serves as an intermediate memory for storing copies of packets that have been scheduled but not yet transmitted.

Upon scheduling a packet (e.g., upon copying the work request from the SW send queue to NIC send queue 94), scheduler 60 (i) copies the packet from packet buffer 110 to packet buffer 114, (ii) configures the work request to point to the copy of the packet in buffer 114 instead, and not to the original packet in buffer 110, and (iii) issues a completion notification to the host. From this point, the host if free to overwrite the original packet in buffer 110, and the original work request on queue 90A.

In alternative embodiments, instead of the above-described copying mechanism, scheduler 60 may maintain a correlation between work requests on the SW send queue(s) and the corresponding work requests on the NIC send queue (s). When a completion is issued on a NIC Send Queue, scheduler 60 can correlate this completion to the originating work request on the SW send queue.

Another requirement from the completion notification mechanism is to maintain strict First-In First-Out (FIFO) order between the work requests and the corresponding completion notifications. The basic requirement is that, for a specified packet source, the network adapter should return completion notifications in the same order in which the packet source posted the work requests. The term "packet source" in this context may refer to a host, a queue, a Virtual Machine (VM), an application, or any combination (including all hosts). By the same token, the network adapter is typically free to reorder completion notifications that pertain to different packet sources (e.g., different hosts, different VMs, different applications, etc.).

Thus, in some embodiments scheduler 60 maintains a database of completion notifications in order to comply with the above-described FIFO order. If a packet is transmitted out-of-order from a NIC send queue, thereby causing an out-of-order completion notification, scheduler 60 stores this completion notification in the database and does not forward it to the packet source. Then, following every successive completion notification to the same packet source, scheduler 60 examines the database and checks whether the pending completion notification is now in-order. If so, the scheduler sends the completion notification to the packet source. Alternatively, scheduler 60 may use any other suitable technique for maintaining FIFO order between WQEs and completion notifications per packet source.

The configurations of network adapter 20 and its various components, such as TDM scheduler 60, shown in FIGS. 1 and 3-6, are example configurations that are chosen purely for the sake of conceptual clarity. Any other suitable configurations can be used in alternative embodiments. In various embodiments, network adapter 20 and its various components can be implemented using hardware, e.g., using one or more Application-Specific Integrated Circuits (ASIC) and/or Field-Programmable Gate Arrays (FPGA), using software, or using a combination of hardware and software components.

In some embodiments, certain components of network adapter 36, and of system 20 in general, e.g., some of the functions of scheduler 60, may be implemented using a general-purpose processor, which is programmed in software to carry out the functions described herein. For example, as noted above, some or all queues and/or buffers described herein may reside in the host. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address optical networks, by way of non-limiting example, the methods and systems described herein can also be used in other applications, such as in Time-Sensitive Networks (TSN) and reconfigurable networks in general.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a host interface, to receive, from one or more hosts, packets for transmission to respective destinations over a network; and
a scheduler, to:
synchronize to a time-division schedule that is employed in the network, the time-division schedule specifying multiple time-slots, wherein a topology of the network alternates between the time-slots so that groups of the destinations are reachable during only some of the time-slots due to alternation of the topology; and
based on the time-division schedule, schedule transmission times of the packets to the network on time-slots during which the respective destinations of the packets are reachable,
wherein the host interface is to receive a packet from one of the hosts at a time at which a destination of the packet is not reachable, and the scheduler is to schedule a transmission time of the packet on a time-slot during which the destination is reachable.

2. The network adapter according to claim 1, wherein the one or more hosts are unaware of the time-division schedule.

3. The network adapter according to claim 1, wherein the received packets originate from one or more applications running on the one or more hosts, and wherein the one or more applications are unaware of the time-division schedule.

4. The network adapter according to claim 1, wherein the scheduler is to schedule the transmission times, both in cases in which the packets are received from the one or more hosts in accordance with the time-division schedule, and in cases in which the packets are received from the one or more hosts not in accordance with the time-division schedule.

5. The network adapter according to claim 1, wherein the scheduler is to queue work-requests of the packets in one or more queues, and to serve the work-requests of the packets in accordance with the time-division schedule.

6. The network adapter according to claim 5, wherein the scheduler is to cause the packet to be transmitted during the time-slot, by queuing a wait-work-request, which is indicative of a timing of the time-slot, ahead of a work-request of the packet.

7. The network adapter according to claim 5, wherein the scheduler is to queue all the work-requests in a single queue.

8. The network adapter according to claim 5, wherein the time-division schedule specifies multiple interleaved repetitions of each time-slot, and wherein the scheduler is to queue the work-requests in multiple queues, each queue associated with the repetitions of a respective time-slot.

9. The network adapter according to claim 5, wherein the scheduler is to queue the work-requests in a plurality of virtual output queues (VOQs) associated respectively with the time-slots, and to transfer the work-requests from the VOQs to the one or more queues.

10. The network adapter according to claim 1, wherein the scheduler is to send completion notifications to the one or more hosts.

11. The network adapter according to claim 10, wherein the scheduler is to send the completion notifications responsively to scheduling of the packets.

12. The network adapter according to claim 10, wherein the scheduler is to send the completion notifications responsively to actual transmission of the packets to the network.

13. The network adapter according to claim 10, wherein the scheduler is to send the completion notifications to a specified packet source in a same order in which the packets were received from the given specified packet source, irrespective of an order in which the packets are transmitted to the network.

14. A method, comprising:
receiving, from one or more hosts, packets for transmission to respective destinations over a network;
synchronizing to a time-division schedule that is employed in the network, the time-division schedule specifying multiple time-slots, wherein a topology of the network alternates between the time-slots so that groups of the destinations are reachable during only some of the time-slots due to alternation of the topology; and
based on the time-division schedule, scheduling transmission times of the packets to the network on time-slots during which the respective destinations of the packets are reachable,
wherein receiving the packets comprises receiving a packet from one of the hosts at a time at which a destination of the packet is not reachable, and scheduling the transmission times comprises scheduling a transmission time of the packet on a time-slot during which the destination is reachable.

15. The method according to claim 14, wherein the one or more hosts are unaware of the time-division schedule.

16. The method according to claim 14, wherein the received packets originate from one or more applications running on the one or more hosts, and wherein the one or more applications are unaware of the time-division schedule.

17. The method according to claim 14, wherein scheduling the transmission times is performed both in cases in which the packets are received from the one or more hosts in accordance with the time-division schedule, and in cases in which the packets are received from the one or more hosts not in accordance with the time-division schedule.

18. The method according to claim 14, wherein scheduling the transmission times comprises queuing work-requests of the packets in one or more queues, and serving the work-requests of the packets in accordance with the time-division schedule.

19. The method according to claim 18, wherein scheduling the transmission times comprises causing the packet to be transmitted during the time-slot, by queuing a wait-work-request, which is indicative of a timing of the time-slot, ahead of a work-request of the packet.

20. The method according to claim 18, wherein scheduling the transmission times comprises queuing all the work-requests in a single queue.

21. The method according to claim 18, wherein the time-division schedule specifies multiple interleaved repetitions of each time-slot, and wherein scheduling the transmission times comprises queuing the work-requests in multiple queues, each queue associated with the repetitions of a respective time-slot.

22. The method according to claim 18, wherein scheduling the transmission times comprises queuing the work-requests in a plurality of virtual output queues (VOQs) associated respectively the with time-slots, and transferring the work-requests from the VOQs to the one or more queues.

23. The method according to claim 14, and comprising sending completion notifications to the one or more hosts.

24. The method according to claim 23, wherein sending the completion notifications is performed responsively to scheduling of the packets.

25. The method according to claim 23, wherein sending the completion notifications is performed responsively to actual transmission of the packets to the network.

26. The method according to claim 23, wherein sending the completion notifications comprises sending the completion notifications to a specified packet source in a same order in which the packets were received from the given specified packet source, irrespective of an order in which the packets are transmitted to the network.

27. A network adapter, comprising:
a host interface, to receive, from one or more hosts, packets for transmission to respective destinations over a network; and
a scheduler, to:
synchronize to a time-division schedule that is employed in the network, the time-division schedule specifying multiple time-slots, wherein a topology of the network alternates between the time-slots so that groups of the destinations are reachable during only some of the time-slots due to alternation of the topology;
based on the time-division schedule, schedule transmission times of the packets to the network on time-slots during which the respective destinations of the packets are reachable; and
send completion notifications to the one or more hosts, including sending the completion notifications to a specified packet source in a same order in which the packets were received from the given specified packet source, irrespective of an order in which the packets are transmitted to the network.

28. A network adapter, comprising:
a host interface, to receive, from one or more hosts, packets for transmission to respective destinations over a network; and
a scheduler, to:
synchronize to a time-division schedule that is employed in the network, the time-division schedule specifying multiple time-slots, wherein a topology of the network alternates between the time-slots so that groups of the destinations are reachable during only some of the time-slots due to alternation of the topology;
based on the time-division schedule, schedule transmission times of the packets to the network on time-slots during which the respective destinations of the packets are reachable; and
queue work-requests of the packets in one or more queues, and serve the work-requests of the packets in accordance with the time-division schedule, including causing a packet to be transmitted during a given time-slot by queuing a wait-work-request, which is indicative of a timing of the given time-slot, ahead of a work-request of the packet.

* * * * *